(12) United States Patent
Verhoeven et al.

(10) Patent No.: US 10,609,933 B2
(45) Date of Patent: Apr. 7, 2020

(54) METHOD FOR CLEANING AND STORING OF A MOULD DRUM

(71) Applicant: GEA Food Solutions Bakel B.V., EN Bakel (NL)

(72) Inventors: Martinus Johannes Wilhelmus Verhoeven, Tilburg (NL); Andreas Leonardus De Bijl, Den Dungen (NL)

(73) Assignee: GEA FOOD SOLUTIONS BAKEL B.V., Bakel (NL)

(*) Notice: Subject to any disclaimer, the term of this patent is extended or adjusted under 35 U.S.C. 154(b) by 115 days.

(21) Appl. No.: 15/555,655

(22) PCT Filed: Mar. 11, 2016

(86) PCT No.: PCT/EP2016/055274
§ 371 (c)(1),
(2) Date: Sep. 5, 2017

(87) PCT Pub. No.: WO2016/146519
PCT Pub. Date: Sep. 22, 2016

(65) Prior Publication Data
US 2019/0116813 A1      Apr. 25, 2019

(30) Foreign Application Priority Data

Mar. 13, 2015 (EP) .................................. 15159045
Jun. 3, 2015 (EP) .................................. 15170523

(51) Int. Cl.
*A22C 7/00* (2006.01)
*B08B 9/00* (2006.01)
*B08B 9/08* (2006.01)

(52) U.S. Cl.
CPC .............. *A22C 7/0069* (2013.01); *B08B 9/00* (2013.01); *B08B 9/0804* (2013.01); *A22C 7/0076* (2013.01)

(58) Field of Classification Search
CPC combination set(s) only.
See application file for complete search history.

(56) References Cited

U.S. PATENT DOCUMENTS

| | | |
|---|---|---|
| 2,200,224 A | 5/1940 | Brownstein |
| 2,657,423 A | 11/1953 | Elsaesser |

(Continued)

FOREIGN PATENT DOCUMENTS

| | | |
|---|---|---|
| CN | 1949981 A | 4/2007 |
| CN | 103429090 A | 12/2013 |

(Continued)

OTHER PUBLICATIONS

International Search Report and Written Opinion for International Application No. PCT/EP2016/055274, dated Sep. 29, 2016.

(Continued)

*Primary Examiner* — Erin F Bergner
(74) *Attorney, Agent, or Firm* — The Dobrusin Law Firm, P.C.

(57) ABSTRACT

The present invention relates to a mould drum for moulding products from a mass of food starting material. The mould drum comprises one or more cavities with a mould cavity wall having at least partially a porous structure, whereas each cavity is connected to a passage. The present invention further relates to a cleaning apparatus and a forming apparatus preferably provided with a cleaning device for the inventive mould drum with supporting means for supporting the axis of the drum. Additionally, the present invention relates to a process for cleaning the inventive drum.

20 Claims, 4 Drawing Sheets

(56) References Cited

U.S. PATENT DOCUMENTS

Figure 1B:
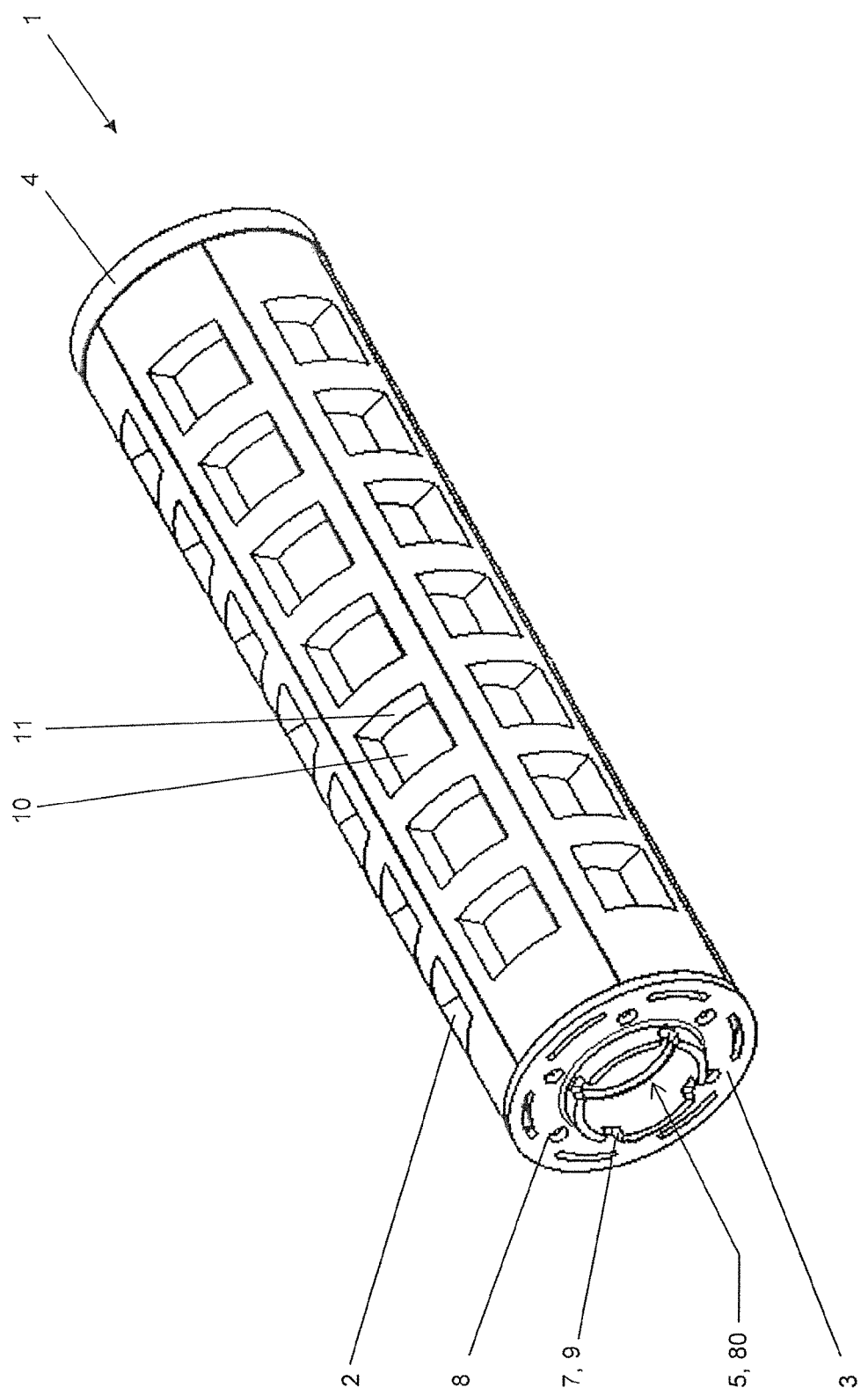

| Patent No. | | Date | Inventor |
|---|---|---|---|
| 3,177,524 | A | 4/1965 | Gause |
| 3,178,791 | A | 4/1965 | Dickson |
| 3,205,837 | A | 9/1965 | Fay |
| 3,213,486 | A | 10/1965 | Blake |
| 3,347,176 | A | 10/1967 | Hail |
| 3,427,649 | A | 2/1969 | Fay |
| 3,660,484 | A | 5/1972 | Martin et al. |
| 3,724,026 | A | 4/1973 | Gernandt |
| 3,750,232 | A | 8/1973 | Holly |
| 3,823,633 | A | 7/1974 | Ross |
| 3,991,440 | A | 11/1976 | Hendrickson, Jr. |
| 3,998,574 | A | 12/1976 | Blake |
| 4,182,003 | A | 1/1980 | Lamartino et al. |
| 4,212,609 | A | 7/1980 | Fav |
| 4,418,446 | A | 12/1983 | Sandberg et al. |
| 4,582,226 | A | 4/1986 | Doak |
| 4,625,612 | A | 12/1986 | Oliver |
| 4,630,425 | A | 12/1986 | Reed |
| 4,630,426 | A | 12/1986 | Gentry |
| 4,739,103 | A | 4/1988 | Hansen et al. |
| 4,742,470 | A | 5/1988 | Juengel |
| 4,768,325 | A | 9/1988 | Lindee et al. |
| 4,987,643 | A | 1/1991 | Powers et al. |
| 5,102,238 | A | 4/1992 | Contzen |
| 5,246,362 | A | 9/1993 | Kobayashi |
| 5,340,599 | A | 8/1994 | Maruyama et al. |
| 5,370,746 | A | 12/1994 | Pedersen |
| 5,503,033 | A | 4/1996 | Van Niekerk |
| 5,536,329 | A | 7/1996 | St. Martin |
| 6,131,372 | A | 10/2000 | Pruett |
| 6,368,092 | B1 | 4/2002 | Lindee et al. |
| 6,371,278 | B1 | 4/2002 | Hart et al. |
| 6,463,940 | B1 | 10/2002 | Thomas |
| 6,764,293 | B2 | 7/2004 | Kashulines et al. |
| 7,090,882 | B2 | 8/2006 | Koefod et al. |
| 7,146,992 | B2 | 12/2006 | Elick et al. |
| 7,467,636 | B2 | 12/2008 | Welch |
| 7,819,650 | B2 | 10/2010 | Meskendahl et al. |
| 10,370,229 | B2 | 8/2019 | Van Gerwen |
| 2003/0042639 | A1 | 3/2003 | Christiaens et al. |
| 2004/0035540 | A1 | 2/2004 | Mäenpää et al. |
| 2004/0144263 | A1 | 7/2004 | Van Esbroeck et al. |
| 2004/0253352 | A1 | 12/2004 | Koefod et al. |
| 2005/0013895 | A1 | 1/2005 | Azzar |
| 2005/0042321 | A1 | 2/2005 | LaBruno et al. |
| 2005/0214399 | A1 | 9/2005 | LaBruno et al. |
| 2005/0220932 | A1 | 10/2005 | Van Der Eerden et al. |
| 2007/0028742 | A1 | 2/2007 | Mueller et al. |
| 2007/0224305 | A1 | 9/2007 | Meskendahl et al. |
| 2007/0277855 | A1 | 12/2007 | DiPanni |
| 2008/0008799 | A1 | 1/2008 | Zuger |
| 2008/0026026 | A1 | 1/2008 | Lu et al. |
| 2008/0202226 | A1 | 8/2008 | Heim et al. |
| 2009/0134544 | A1 | 5/2009 | Van Der Eerden et al. |
| 2010/0024359 | A1 | 2/2010 | Feisel |
| 2011/0014344 | A1 | 1/2011 | Meskendahl et al. |
| 2011/0151082 | A1 | 6/2011 | VanGerwen et al. |
| 2012/0003374 | A1 | 1/2012 | Van der Eerden et al. |
| 2012/0058213 | A1 | 3/2012 | Lindee et al. |
| 2013/0045294 | A1 | 2/2013 | Van Gerwen et al. |
| 2013/0224351 | A1 | 8/2013 | Maragno |
| 2013/0291483 | A1 | 11/2013 | Van Gerwen |
| 2018/0255824 | A1 | 9/2018 | Meskendahl et al. |

FOREIGN PATENT DOCUMENTS

| | | |
|---|---|---|
| DE | 2715925 A1 | 11/1977 |
| DE | 10048081 A1 | 6/2002 |
| DE | 102006020361 A1 | 8/2007 |
| EP | 0190847 A1 | 8/1986 |
| EP | 0638371 A1 | 2/1995 |
| EP | 0818148 A1 | 1/1998 |
| EP | 1281446 A1 | 2/2003 |
| EP | 1287959 A2 | 3/2003 |
| EP | 1520480 A1 | 4/2005 |
| EP | 2064956 A1 | 6/2009 |
| FR | 2387609 A | 11/1978 |
| GB | 1015820 A | 1/1966 |
| GB | 2312641 A | 11/1997 |
| GB | 2378152 A | 2/2003 |
| JP | S57-43637 A | 3/1982 |
| JP | S58-056632 A | 4/1983 |
| JP | H08-116861 A | 5/1996 |
| JP | 2001-200767 A | 7/2001 |
| JP | 2002-224508 A | 8/2002 |
| JP | 2004-521652 A | 7/2004 |
| JP | 2004-249168 A | 9/2004 |
| JP | 2005-530514 A | 10/2005 |
| JP | 2007-536927 A | 12/2007 |
| JP | 2014-507126 A | 3/2014 |
| JP | 2014-117183 A | 6/2014 |
| WO | 88/07003 A1 | 9/1988 |
| WO | 0030458 A1 | 6/2000 |
| WO | 2004/002229 A2 | 1/2004 |
| WO | 2005/000029 A2 | 1/2005 |
| WO | 2005/009696 A1 | 2/2005 |
| WO | 2005/017481 A1 | 2/2005 |
| WO | 2006/020139 A1 | 2/2006 |
| WO | 2008/091634 A2 | 7/2008 |
| WO | 2010/0110655 A1 | 9/2010 |
| WO | 2012/0055454 A2 | 5/2012 |
| WO | 2012/0059188 A1 | 6/2012 |
| WO | 2012/084215 A1 | 6/2012 |
| WO | 2012/107236 A2 | 8/2012 |
| WO | 2014/118368 A2 | 8/2014 |

OTHER PUBLICATIONS

*Townsend Further Processing News*, brochure, published Jun. 2010.
Potentially related U.S. Appl. No. 13/883,152 Published as 2013/0224357, Aug. 29, 2013, Van Gerwen.
Potentially related U.S. Appl. No. 13/980,778 Published as 2013/0291483, Nov. 7, 2013, Van Gerwen.
Potentially related U.S. Appl. No. 13/982,377 Published as WO2012/107236, Aug. 16, 2012.
European Examination Report dated Oct. 11, 2018 for European Patent Application 16712269.6.
J. M. A. Snijders et al: "Lactic acid as a decontaminant in slaughter and processing procedures", Veterinary Quarterly.,vol 7, No. 4, Oct. 1, 1985 (Oct. 1, 1985), pp. 277-282.
Rebecca. M. Goulter et al: "Decontamination of Knives Used in the Meat industry: Effect of Different Water Temperature and Treatment Time Combinations on the Reduction of Bacterial Numbers on Knife Surfaces", Journal of Food Protection, vol. 71, No. 7, Jul. 1, 2008 (Jul. 1, 2008), pp. 1338-1342.
Gunther Heinz et al: "Cleaning and Sanitation in Meat Plants", Meat processing technology for small to medium scale producers, Jan. 1, 2007 (Jan. 1, 2007), URL:http://www.fao.org/docrep/01 O/ai407e/A1407E26.htm.
Third Party Observation for European Application 16712269.6, dated Aug. 6, 2018.
Tetra Pak (2015): Handbook: Cleaning in place, a guide to cleaning technology in the food processing industry.
ABB Instrumentation (2010): Monitoring cleaning of food and pharmaceutical production systems.
HC heat transfer solutions (2012): Common Operating Problems for Air-coolers.
G. Boumans (1985): Grain handling and Storage, by Elsevier Science Publishers B. V., vol. 4, ISBN 0-444-42439-3.
NIZO food research BV (2012): How to improve and control the performance of CIP processes, Webinar on https://www.youtube.com/watch?v—rY1 Vh2SscNQ.
J. Eagle (2015): Tetra Pak to develop its patent pending sensors to 'see' what is happening inside a plant when cleaning.
Japanese Office Action for Japanese Application 2017-547946; dated Dec. 17, 2019.

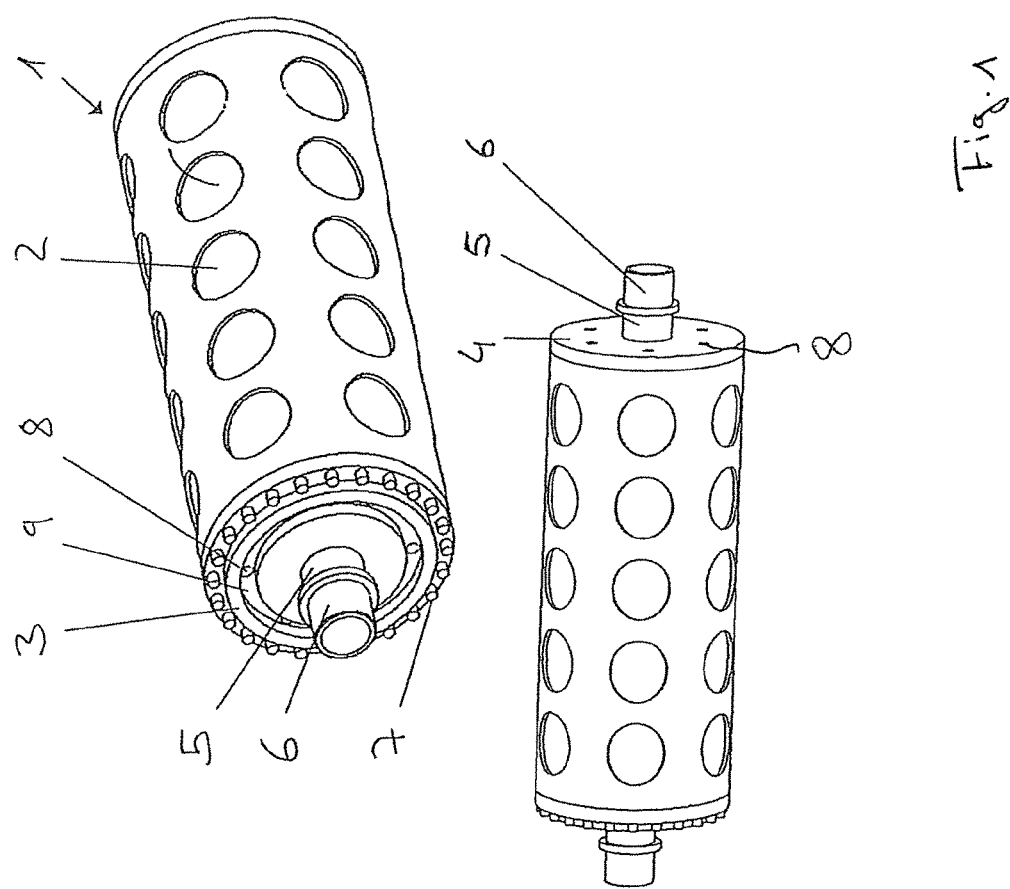

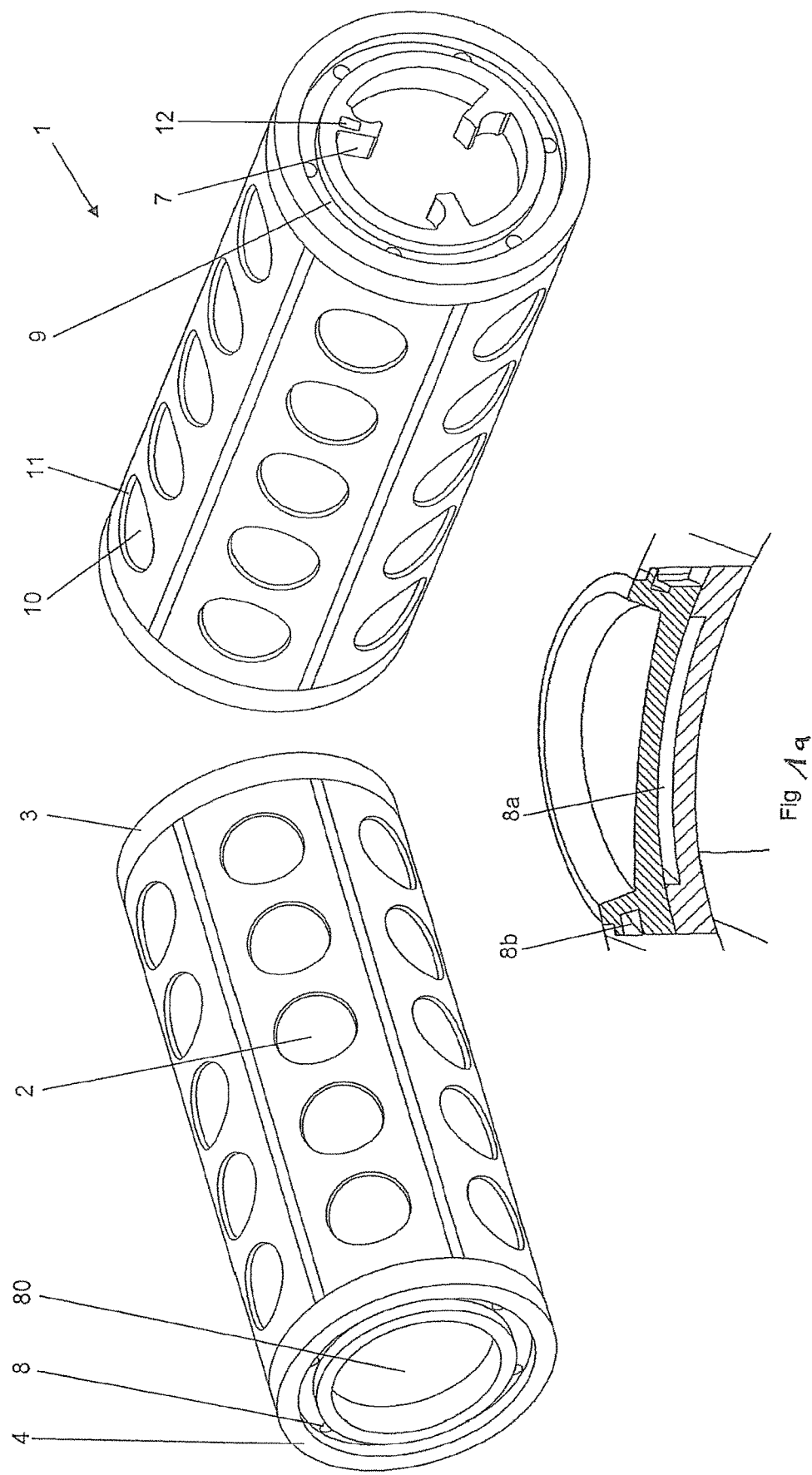

METHOD FOR CLEANING AND STORING OF A MOULD DRUM

The present invention relates to a method to clean a mould drum. The present invention further relates to a method of using a mould drum for moulding food products and an apparatus for molding food products.

Hygiene is an important issue in the food processing industry. It is therefore important that machine parts, which are in contact with a food product, are cleaned regularly. Particularly, when using a drum with cavities with a porous structure for producing formed food products, the drum must be cleaned regularly. WO 2005/107481 and WO 2012/084215 describe apparatus and methods who to cleans a food forming drum, which, however, have the deficiency, that the drum can get re-contaminated during storage.

It was therefore the objective of the present invention to provide a process which does not have the deficiencies according to the state of the art.

This problem is attained with a method for cleaning and storing a mould drum for moulding products from a mass of food starting material, comprising one or more cavities with a mould cavity wall having at least partially a porous structure, whereas each cavity is connected to a passage, the method comprising the steps of:

a. Cleaning of the drum,
b. Treatment of the drum with a bacteriostatic-substance and
c. Storing of the drum with the bacteriostatic-substance on and/or in the drum.

The disclosure made regarding this subject matter also applies to the other subject matters and vice versa.

The present invention relates to the cleaning of a mould drum for moulding products from a mass of food starting material. Particularly, the present invention relates to cleaning of a mould drum for forming meat, for example into two- or three dimensional patties. The mould drum comprises one, preferably more cavities, which are arranged on the surface of the drum. These cavities are preferably arranged around the entire circumference of the mould drum and a multitude of cavities are arranged in parallel; i.e. in rows. During the production, one row of cavities is filled and emptied simultaneously. During production, the drum rotates. Such a drum with porous cavities is and the respective food product forming device is for example disclosed in U.S. Pat. No. 3,427,649, WO 2012/084215 or in U.S. Pat. No. 3,205,837. These documents are herewith incorporated by reference and their disclosure is therefore part of the disclosure of the present patent application.

Each mould cavity has a cavity wall; i.e. sidewall and/or a bottom, which is at least partially porous so that the cavity wall is permeable for gas and/or a cleaning fluid. The porous structure is for example a sintered structure. The porous structure has a multitude of channels, which extend from one surface of the structure to the other surface of the structure. Preferably, the channels are interconnected. The drum can comprise one cylindrical element which is entirely made from a porous material. Alternatively, the drum comprises porous inlays.

Furthermore, according to the present invention, each cavity is connected to a passage, to vent the cavity during filling, provide pressurized gas in order to remove the food product from the cavity and/or to supply a cleaning fluid to the cavity. Preferably, all cavities in one row are interconnected to each other by one passage. This passage preferably extends from the first front end to the second front end of the mould drum, i.e. a cleaning fluid introduced at one front end can leave the drum at the other front end without being forced through the porous structure. This embodiment has the advantage that particularly during cleaning, the passage can be rinsed and food particles in the passage can be easily discharged from the passage.

According to the present invention, after use, the mould drum is cleaned, for example to remove food particles, grease or the like. Afterwards, the drum is treated with a bacteriostatic-substance, which at least reduces the growth of micro-organisms on or in the mould drum. Preferably, this bacteriostatic-substance is liquid. According to the present invention, the bacteriostatic-substance is not removed from the mould drum prior to storing, but remains in and/or on the surface of the mould drum.

The inventive method has the advantage that:
it is less time consuming,
less water is needed,
no possible toxic or hazardous disinfectant is required,
the impact on the environment is reduced,
no or little micro-organisms growth after cleaning
Lime has less chance to adhere to the porous structure with the result of less chance that the pores of the porous structure will be blocked.

According to a preferred embodiment of the present invention, the drum is pre-cleaned e.g. to remove particles from the mould drum. This can be carried out with preferably cold water to prevent protein to coagulate.

Preferably, the cleaning is carried out with an alkaline cleaning agent. The cleaning with an alkaline cleaning agent can be done after pre-cleaning preferably at a temperature of around 55° C. to fluidize fat particles and therefore achieve the maximum effect of the alkaline cleaning.

Preferably, the mould drum is rinsed after cleaning, more preferably after the cleaning with the alkaline cleaning agent. This needs to be done thoroughly to achieve the maximum effect of the use of acid in the next steps in the cleaning process.

During cleaning, the used cleaning substance is preferably at least partially recycled. The recycling circuit therefore comprises a filter.

All cleaning solutions and/or rinsing substances can be heated.

A bacteriostatic-substance, preferably, an edible organic acid is used, preferably in a concentration between 0.5-2 weight %. A preferred organic acid is citric-acid. The use of an organic acid, particularly citric-acid has the advantage that it is completely food safe, edible and a nontoxic substance.

Preferably, the bacteriostatic-substance has a pH-value<4.5.

Preferably, the bacteriostatic is provided on the surface of the drum and/or within the porous structure and/or in the passage.

Depending on the type of mass to be processed and/or the production process it is preferred to make use of a pasteurization step after the cleaning with alkaline cleaning agent and after the drum is thoroughly rinsed. When using tap water during the pasteurization process, depending on the hardness (calcium content), lime scale will be formed on the surfaces and the porous structure of the drum. The forming of lime scale is accelerated by temperatures of 80° C. and higher of the pasteurization process. Therefore an organic acid such as citric acid will be added during the pasteurization process to prevent lime scale and to remove the already present lime scale. This process prevents an additional cleaning step with a descaler which results in a shorter cleaning time and prevention of the use of chemicals.

The mould drum is in a preferred embodiment covered with a bacteriostatic film and stored in a dry environment. In case the mould drum is stored in a humid environment, the residue of moisture within the drum has a pH<4.5 which prevent any bacterial growth.

The cleaning of the mould drum takes place after the use of the mould drum during production and/or after storage of the mould drum. The mould drum can be cleaned in the forming apparatus but is preferably cleaned in a cleaning apparatus.

Cleaning takes place according a cleaning process which process is manually inputted/chosen and/or automatically provided in case the drum is recognized by the apparatus. In this case the cleaning device automatically chooses the cleaning process, preferably out of a number of stored processes.

According to a preferred or inventive embodiment of the present invention, the cleaning process is adapted and/or controlled by a control step wherein the flow resistance of the porous structure of at least one cavity in one row of cavities, preferably the flow resistance of one entire row of cavities and even more preferably in each row of cavities of the drum is measured and compared to a reference value and/or analyzed over time. As long as the flow resistance, which can be for example measured according to the pressure needed to achieve a certain flow rate and/or the pressure drop over the porous structure is not reduced to a certain pressure drop, preferably the pressure drop of the new drum, the cleaning process is not terminated. According to another preferred or inventive embodiment or an even more preferred embodiment, the initial pressure drop is measured and the cleaning process, for example its duration and/or the temperature of the cleaning fluid and/or the cleaning substance used is selected. In case the change of the pressure drop over the porous structure is monitored over time, preferably the cleaning is not terminated as long as the pressure drop of the porous structure still decreases. Preferably, each row can be cleaned individually. In this case the above said applies for each row. In this case, one row can be cleaned more intensely than another row of porous material of the drum. The pressure drop can be measured before and/or after the porous structure has been dried.

Monitoring if a porous structure is open can be done by measuring the pressure and flow. During the cleaning process a fluid source, for example air and/or water and/or cleaning detergent is pumped via passages through the porous structure of the drum. Pressure and/or flow of the fluid source will be monitored, preferably continuously, during the cleaning process.

The longer the cleaning process takes, the more the pressure will decrease and/or the flow will increase until a final value, the value when the drum is clean, is reached. Practice has shown, that this value can be a dependent on the drum configuration, e.g. number of rows, number of cavities, the shape of the cavities, the thickness of the porous material etc.

Before using the drum a first time in production a reference measurement of the pressure drop of the drum and/or the pressure of the cleaning fluid to achieve a certain fluid flow should be made which values should be stored and used as reference values. These values will be the reference values to determine later on if a drum is open, i.e. if the porous structure and/or the fluid passages in the drum are clean.

The cleaning program, cleaning results, reference measurement pressure and/or flow and monitored pressure and/or fluid flow values can be stored in the apparatus wherein a drum is cleaned or in a central data storage and/or in a storage, for example an RFID on the drum.

In case the drum has a storage element, for example an RFID, the drum can be recognized in the forming apparatus as well as in the cleaning apparatus. History of cleaning such as cleaning program and cleaning result can be extended with the reference measurement of pressure and/or fluid flow and the monitored pressure and fluid flow values. This history can be stored on the storage element of the drum or the apparatus in which the drum is cleaned. When using multiple cleaning apparatus preferably the history is stored in a central data system to prevent that the storage element of a certain drum will not be updated well or will be out of memory.

By continuously monitoring the pressure and fluid flow of the fluid source it is even possible to stop the cleaning process already as the pressure and flow reaches desired values. On the other hand, when at the end of the cleaning process the desired values of pressure and flow are not reached, the cleaning process can be extended until the desired values are reached.

Another subject matter of the present invention is a method for using a mould drum for moulding food products from a mass of food starting material, comprising one or more cavities with a mould cavity wall having at least partially a porous structure, whereas each cavity is connected to a passage, the method comprising the steps of:

a. Removing the mould drum from the storage,
b. Removing a bacteriostatic-substance from the mould drum.

The disclosure made regarding this subject matter also applies to the other subject matters and vice versa.

According to the present invention, the mould drum is removed from a storage. In the storage, on the surface and/or in the porous material and/or in each passage of the mould drum, a bacteriostatic substance is present. After removal of the mould drum from the storage, this bacteriostatic substance is removed from the mould drum. This removal preferably takes place by rinsing the drum preferably with cold water. This water is not recycled in order to avoid accumulation of the bacteriostatic substance in the rinsing water.

Preferably, each passage is connected to a fluid source, preferably a water source. The fluid flows through the passage and the porous structure to the surface of the mould drum and more preferably also rinses the surface of the mould drum.

Preferably, the rinsing takes place in an apparatus to form food products from a food mass, i.e. the mould drum is taken out of the storage and then placed into the apparatus in which the food products are formed. In this apparatus, the bacteriostatic-substance is removed from the mould drum, preferably by rinsing. After the removal of the bacteriostatic substance is finalized, the forming of food products it the mould drum can start. Hence, the mould drum need not be placed into a cleaning unit prior to its use in the forming apparatus, even though this alternative is also feasible.

Preferably, the food forming apparatus comprises a fluid-, preferably a water-source to which the mould drum is, preferably temporarily, connected. Preferably, the removal of the bacteriostatic-substance takes place automatically, e.g. the rinsing-time and the amount of water and the water-volume-flow are automatically controlled by the PLC of the apparatus. However, the removal of the bacteriostatic-substance can be initiated manually. Preferably, the food forming apparatus comprises a control-scheme, which is initiated, each time a mould drum is mounted on the food forming apparatus and which assures that the food forming cannot be started, unless the bacteriostatic-substance has been removed.

Preferably, the mould drum rotates during rinsing. This preferred embodiment of the present invention assures complete removal of the bacteriostatic substance from all parts of the mould drum.

Preferably, the mould drum is dried after removal of the bacteriostatic substance. More preferably, the rinsing agent is removed from the channel and/or the porous structure by compressed gas.

Another subject matter of the present invention is an apparatus to form food products from a food mass with a mould drum, the apparatus comprising means to rotate the mould drum and a mass feed member, which fills the cavities of the mould drum with a food mass and means to remove the formed food product from the cavities, wherein it comprises means to rinse the mold drum prior to forming food products.

The disclosure made regarding this subject matter also applies to the other subject matters and vice versa.

This subject matter relates to an apparatus with a mould drum for moulding food products from a mass of food starting material. Particularly, this part of the invention relates to an apparatus for forming meat, for example into two- or three dimensional patties. The mould drum comprises one, preferably more cavities, which are arranged on the surface of the mould drum. These cavities are preferably arranged around the entire circumference of the mould drum and a multitude of cavities are arranged in parallel; i.e. in rows. During the production, one row of cavities is filled and emptied simultaneously. During production, the drum rotates. Such a drum with porous cavities is and the respective food product forming device is for example disclosed in U.S. Pat. No. 3,427,649, WO 2012/084215 or in U.S. Pat. No. 3,205,837. These documents are herewith incorporated by reference and their disclosure is therefore part of the disclosure of the present patent application.

Each mould cavity has a cavity wall; i.e. sidewall and/or a bottom, which is at least partially porous so that the cavity wall is permeable for gas and/or a cleaning fluid. The porous structure is for example a sintered structure. The porous structure has a multitude of channels, which extend from one surface of the structure to the other surface of the structure. Preferably, the channels are interconnected. The drum can comprise one cylindrical element which is entirely made from a porous material. Alternatively, the drum comprises porous inlays.

Furthermore, according to the present invention, each cavity is connected to a passage, to vent the cavity during filling, provide pressurized gas in order to remove the food product from the cavity and/or to supply a cleaning fluid to the cavity. Preferably, all cavities in one row are interconnected to each other by one passage. This passage preferably extends from the first front end to the second front end of the mould drum, i.e. a cleaning fluid introduced at one front end can leave the drum at the other front end without being forced through the porous structure. This embodiment has the advantage that particularly during cleaning, the passage can be rinsed and food particles in the passage can be easily discharged from the passage.

According to the present invention, the apparatus comprises means to rinse the mold drum prior to forming food products. These means are preferably a water supply which can be permanently or temporarily connected to the mould drum. The water can be sprayed, for example with a spray bar, on the outer surface of the drum and the cavities. Preferably water is applied to at least one passage in the drum via a cover which is in a standstill position and at one front end positioned against the head end of the drum. The apparatus and/or the mould drum comprises distribution means to distribute the rinsing-substance, preferably water or a watery substance to the mould drum. Preferably, the rinsing agent enters the mould drum via one or both of its front ends, flows through each passage, the porous structure and then out of the drum.

Preferably, one front end comprises distribution means, preferably a ring, for distributing a cleaning- and/or drying fluid to all passages. This distribution means interconnects all passages so that the cleaning- and/or drying fluid only has to be provided to the mould drum once; i.e. to the distributor, which distributes the cleaning- and/or drying-fluid to all passages.

According to a preferred embodiment, the rinsing agent is captured and analyzed and as soon as the concentration of the bacteriostatic-substance in the rinsing agent is below a preset value, the rinsing is stopped. This can be a one-time calibration followed later in time by periodic test.

The mould drum can be dried, for example by forcing air through the passage and the porous structure of the mould drum. This can be done with the same pressure source that is utilized to force the formed food products out of the mould cavities of the mould drum.

Preferably, the drum rotates during rinsing. The rotation can be continuous or intermittent. During rinsing, the direction of rotation can be changed. The rotation assures that even if little rinsing agent is used, all parts of the mould drum are subjected to the rinsing agent, so that the bacteriostatic substance is removed.

The rinsing agent can be discharged via the conventional sewage drain.

The mass feed member can be moved from a remote- to a filling position. During rinsing and/or drying of the mould drum, the mass feed member is in its remote position, in which it is at a distance remote from the mould drum. As soon as the rinsing and/or drying is completed, the mass feed member is moved towards the mould drum, so that a pressure plate, which is part of the mass feed member is pressed against the mould drum. The movement of the mass feed member can be linear or a rotation or a combination thereof.

According to another preferred embodiment, the front end of the mould drum comprises form fit means to rotate the mould drum particularly during the production of the formed products and/or during rinsing. This form fit means can be for example a multitude of pins which are distributed equidistantly around the circumference of the front end.

In another preferred embodiment, the mould drum comprises an axis of rotation that extends from both ends of the mould drum. This extension can be utilized to bear the mould drum for example in the forming- and/or a cleaning apparatus. Furthermore, these extensions can be utilized to transport the mould drum for example from the production apparatus to the cleaning apparatus, to the storage unit and vice versa. The axis of rotation can be part of the front end of the mould drum, can be fixed to the front end of the mould drum and/or can extend through the entire center axis of the mould drum.

In another or a preferred embodiment of the present invention, the mould drum comprises a hollow axis of rotation and/or a hollow journal. This hollow axis of rotation and/or a hollow journal can be, for example, utilized to transport the mould drum, for example from the forming apparatus to a cleaning apparatus to the storage unit and vice versa.

Preferably, the mould drum comprises recognition means, preferably an RFID, with a read only- or a read- and write-function. The use of recognition means is advantageously in both, the forming apparatus and/or the cleaning apparatus to clean the drum and/or the storage unit. It gives the opportunity to work with pre-programmed menus in both the forming apparatus and/or cleaning apparatus and/or during rinsing of the mould drum to remove the bacteriostatic substance. This results in quality assurance and faster changeovers and improved traceability of the production- and/or cleaning process. This program can be stored on the recognition means and/or on a control system which is part of the forming apparatus and/or the cleaning apparatus.

When a mould drum will be placed in the forming apparatus the system will recognize it and preferably process parameters, for example: filling pressure for the food mass, rotational speed of the drum, set points to control the fluid to the product cavities to remove the formed products, movement of the belt which remove the formed product from the drum, will be activated. Additionally, also the production history, for example at what time and date the mould drum has been used, standstill periods, temperature of the mass, operating times versus produced capacity, etc, of that particular mould drum in the forming apparatus can be monitored and stored. This information can be for example used to forecast production capacity and/or to proactively initiate service for the mould drum and/or the cleaning- or molding apparatus. Furthermore, the system will preferably recognize a mould drum, which was taken out of storage and will initiate the bacteriostatic removal procedure, preferably the rinsing of the mould drum. The removal program can be uniform for all mould drums or can be an individual program for each mould drum, for example depending on the age of the mould drum, its use-history and/or its residence time in the storage unit. After the removal procedure is completed, this is event is preferably stored on the recognition means and or in the storage of the system.

When the mould drum will be placed in the cleaning apparatus, the drum will be recognized and the, preferably individual, cleaning process for the particular drum will activated. The cleaning program can consist settings like the amount of detergents which are needed, time period of each cleaning step within the cleaning process. Also the cleaning history of the drum can be monitored. This is especially important due to the hygienic demands for food forming processes.

It is advantageous, to clean the mould drum shortly after the production period, to prevent that the openings within the material get clogged. By storing one or more of the above mentioned data into a memory of the forming apparatus and cleaning apparatus and/or in centrally organized memory, it is, for example, afterwards possible to analyze if a problem with a mould drum is related to for example a failed cleaning process.

Preferably, the drum is stored in a storage unit. This storage unit can also be provided with recognition means to control the logistics with respect to mould drums. The forming apparatus, cleaning apparatus and storage unit can be coupled together for a centralized control of the handling of the mould drums. In a preferred embodiment with more tracking- and tracing technology, it will be known which drum is in the forming apparatus, which drum is in the cleaning apparatus, which drums are in the storage unit and even the settings wherewith the forming apparatus and cleaning apparatus are working can be monitored and eventually from a central point be changed. The history of the mould drum with respect to the cleaning apparatus and forming apparatus is also available. A secured central control over the configuration of the production line can be achieved by coupling all used machines together.

Storage locations at food factories are commonly very moist which stimulates bacterial growth. A mould drum provided with a bacteriostatic substance will be able to acidify condensed water in or on the mould drum and therefore prevent bacterial growth.

Identification means in the mould drum can for example be milled grooves which grooves comprise a code which can be recognized by recognition means, for example, machine readable holes forming an unique number, a barcode, a transponder (electronic tag, radio tag, RFID chip) or other identification means are also possible.

The recognition means connected to the forming apparatus and/or cleaning apparatus is a read- and/or write means which is capable to read the identification means which is part of each mould drum and/or write information on the recognition means of the mould drum.

The used technique recognition means must withstand the circumstances during the forming process, during the cleaning process, during storage, particularly in an acid and alkaline environment and/or during further handling of the mould drum, e.g. rinsing of the mould drum. Especially the cleaning-/storing-process where the drum is accommodated within the housing of a cleaning apparatus, the drum will be exposed to detergents, acids, high pressure washing and/or high temperature. To prevent that the identification means placed at/in the mould drum and the recognition means placed at the forming apparatus, cleaning apparatus and/or eventually storage unit will be damaged, they are preferably placed in a protected place and/or integrated in plastic parts.

Another subject matter of the present invention is a method for using a mould drum for moulding products from a mass of food starting material, comprising one or more cavities with a mould cavity wall having at least partially a porous structure, the method comprising the steps of:
  moulding products from a food starting material,
  interrupting the moulding of products,
  wetting the surface of the mould drum and
  restart of moulding products.

This embodiment of the present invention relates to a method of using the drum for moulding products from a food mass, for example minced meat. The food mass starting material is pressed into the cavities of a rotating drum by a mass feed member and formed into food products, for example meat patties. The cavities are at least partially made from a porous material. After the filling, the drum rotates into a discharge position, where the formed products are removed from the drum, by ejecting air through the porous material. Subsequently, the cavities are rotated again into the filling position and are refilled with food mass starting material. The drum rotates, preferably continuously, in one direction.

According to the present invention, the production is interrupted in regular or irregular intervals, for example when new food starting material has to be added to the process and/or when another machine, for example a packaging machine, in the line is down. During such interruptions, the surface of the drum is wetted. This can be, for example, carried out by spraying water on the surface of the drum and/or by condensing steam on the surface of the drum. Preferably, the speed of rotation of the drum is reduced during the interruption of the production of moulded products, but more preferably, the drum maintains its rotation.

Prior to restart of the moulding process, the wetting is preferably stopped and liquid which may have accumulated in the cavities and/or in the pores of the porous material of the cavities is discharged, preferably when the respective cavity is in the discharge position of the drum. The discharge of water can be carried out by gravity and/or supported by passing air through the pores of the cavity.

For wetting purposes, preferably water is sprayed on the surface of the drum, preferably upstream from a mass feed member, i.e. upstream from the filling position of the cavities.

Preferably, the water is removed from the drum in a discharge position.

Preferably, the rotation of the mould drum is maintained during the interruption of the production.

The present invention is now explained according to figures. These explanations do not limit the scope of protection. The explanation applies to all embodiments of the present invention, respectively.

FIGS. 1-1b show the inventive mould drum.

FIG. 1 shows the inventive mould drum 1 with a first front end 3 and a second front end 4. This mould drum 1 comprises on its surface a multitude of cavities 2, which are arranged around the entire circumference and which are open towards the surface. These cavities are utilized to form a food mass, preferably a meat mass into a desired 2D- or 3D-form, for example a patty. Additionally, along its axial extension, the mould drum comprises a multitude of cavities which are arranged in parallel. In the present case, one row of cavities comprises five cavities 2, which are filled simultaneously and emptied simultaneously. During production, each cavity is filled with a food starting material, particularly with meat. Subsequently, this 2D- or 3D-formed product is removed from the cavity. During the production, the drum rotates. Each cavity comprises at least partially a porous structure; i.e. an at least partially porous bottom and/or an at least partially porous sidewall. This porous structure can be utilized to vent the cavity during filling, to apply pressurized air to the cavity to remove the product from the cavity and/or to clean the porous structure. All cavities 2 are connected to a passage 8, through which the cavities are vented and/or air or cleaning fluid is supplied. According to the present invention, this passage extends from the first front end 3 of the drum to the second front end 4 of the drum. On one front side, here on the left front side 3, the inventive mould drum further comprises a distributor 9, here a ring-shaped groove, in order to supply a cleaning fluid to all passages 8 simultaneously, which are fluid-wise connected to the distributor. Furthermore, form fit means 7, here embodied as pins, can be arranged on the circumference of the front end 3 which are utilized to rotate the drum particularly during production. From the first front end 3 and the second front end 4 an axis of rotation 5 extends, respectively, which is used to bear the mould drum during its rotation in the production device and/or to bear the drum during its cleaning and/or to transport the drum. If needed, bearings 6 are fixed to the axis of rotation 5.

FIG. 1a shows another embodiment of the inventive mould drum 1. The mould drum has in a preferred embodiment a stainless steel base with fixedly placed inserts which inserts are partly or completely made from material with a porous structure, which is preferably made from a stainless steel material. The mould drum is provided with a multitude of product cavities 2 which are arranged around the entire circumference of the mould drum and which form a row of cavities in longitudinal direction of the drum and which are open towards the surface and are utilized to form a food mass into a product, for example a patty. The mould drum has a first axial front end 3 and a second axial front end 4. Every row of product is provided with at least one passage 8 through which the cavities are vented and/or cleaning fluid is supplied. Each passage preferably extends from the first axial front end 3 to the second front end 4. A distributor 9 for a pressurized fluid is preferably integrated in first frond end 3. The mould drum has a relatively large internal opening 80. Further form-fit means 7 are provided to drive the drum in the forming apparatus. Here the form-fit-means are located within the opening 80, so that they are protected and cannot be, for example, contaminated by the food mass.

FIG. 1a shows a preferred location for identification means 12 at mould drum 1. Preferably the identification means 12 at the drum should be provided in first front end 3. The drum can be provided with more than one identification means 12 to prevent that the forming apparatus or cleaning apparatus can recognized the mould drum only by means of one identification means 12 and/or to prevent that there is only one pre-determined position wherein the drum will be recognized by the forming apparatus or cleaning apparatus.

Via a mass supply system (not depicted), a food mass will be transported to a mass feed member provided with a fill opening adjacent to the mould drum 1. When a row of cavities in the drum is at least partially congruent with the fill opening, the mass, which is pressurized with relatively low pressure, will flow into the open cavities. During filling the air within the cavities preferably escapes via the porous structure of the bottom 10 and when applied, the porous structure of the sidewalls 11. The air will escape out of the drum via passages 8. During further rotation of the drum a seal will preferably keep the formed products within the cavities till the row of formed products is approaching for example the lowest position of the drum. This is the moment that the formed products have to be removed from the cavities by using a fluid, preferably air, under excess pressure. Removing of the products can be done in several ways. When the product cavities are provided with a porous bottom 10 and side wall 11 has a closed structure, fluid only has to be provided in a passage 8 which is directed to the porous bottom 10. When the product cavities are provided with a porous bottom 10 and a porous sidewall 11, fluid can to be provided to both the bottom wall and/or sidewall. When using one passage 8 per row of cavities the porous cavities can be designed such that the fluid flow exits the porous structure of the bottom 10 and sidewall 11 at the same time.

FIG. 1a shows an example of a cross view of a mould drum, wherein 2 passages will be used, one separate passage 8a for the bottom and one separate passage 8b for the sidewall. Several options how to provide a pressurized fluid to the bottom and/or the sidewall are preferred. Fluid can exit the porous structure of the bottom and sidewall essentially at the same time, by directing the fluid to both passages 8a, 8b simultaneously. Fluid can be directed first to a passage 8b, which is connected to the porous structure of the sidewall and at least partially afterwards fluid can be directed to a passage 8a, which is connected to the porous structure of the bottom. Alternatively, fluid can be directed first to a passage 8a, which is connected to the porous structure of the bottom, and at least partially afterwards, the fluid is directed to a passage 8b which is connected to the porous structure of the sidewall. When using large products even more than two passages per row of product cavities can be used to improve the control of removing the formed products out of the product cavities.

FIG. 1b shows another embodiment of a mould drum. Here the form-fit-means will also be used as distributor 9 for the cleaning fluid when the drum will be cleaned in a cleaning apparatus.

Figure 2:
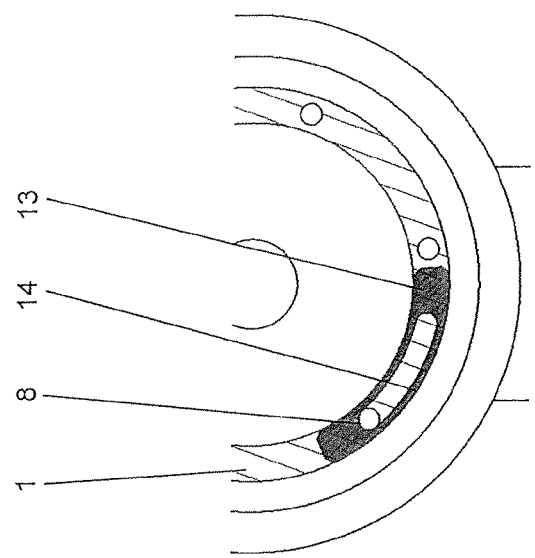
Figure 2:
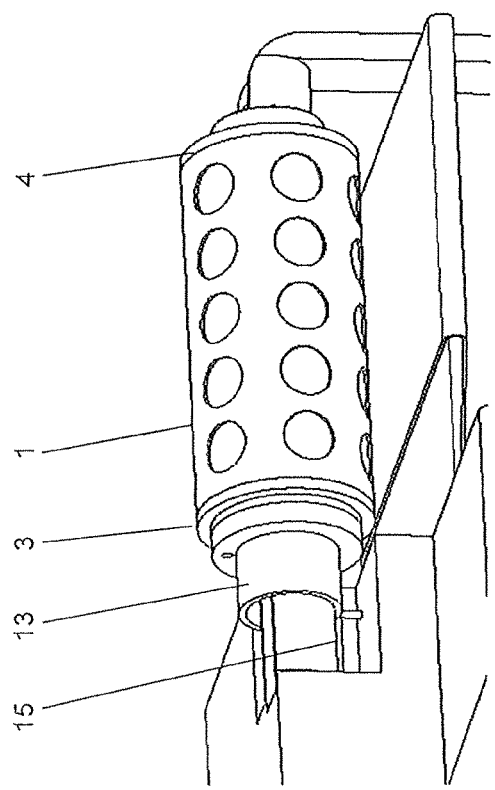

A first method to remove the bacteriostatic-substance from the drum in the forming apparatus is by loading the drum, rotate the drum for a number of rotations and spray water on the outer surface of the drum and the cavities. Then clean the drum further by applying air via cover 13. Due to rotation of the drum every passage 8 will independently of each other be provided with air by supply connection 15 and recess 14 which is part of cover 13 as shown in FIG. 2. In a second method, after the drum is loaded in the forming apparatus, water is applied via cover 13 and the drum rotates for a number of rotations. Water will now flow in each and every passage. In a final step water supply will be stopped and the drum will be further cleaned by air via cover 13.

LIST OF REFERENCE SIGNS 1 drum
2 product cavities
3 first front end
4 second front end
5 axis of rotation
6 bearings
7 form-fit-means
8 passage
9 distributor
10 bottom
11 sidewall
12 identification means
13 Cover
14 Recess
15 Fluid supply connection
80 drum opening

The invention claimed is:

1. A method for cleaning and storing a mould drum for moulding products from a mass of food starting material, the mould drum comprising one or more cavities, each of the one or more cavities having a mould cavity wall having an at least partially porous structure, and each of the one or more cavities are connected to a passage, the method comprising steps of:
   a. cleaning the mould drum and providing a cleaning fluid via the passage,
   b. treating the mould drum with a bacteriostatic-substance, and
   c. storing the mould drum with the bacteriostatic-substance on and/or in the mould drum,
   wherein prior and/or during the cleaning step, a pressure and/or fluid flow of the cleaning fluid is measured, and a pressure drop of the cleaning fluid is measured across the at least partially porous structure, and
   wherein the cleaning step is carried out and/or changed until a reference value of the pressure of the cleaning fluid and/or the pressure drop of the cleaning fluid is measured or determined.

2. The method according to claim 1, wherein the method comprises a step of: pre-cleaning the mould drum to remove particles from the mould drum.

3. The method according to claim 1, wherein the cleaning step is carried out with an alkaline cleaning agent.

4. The method according to claim 1, wherein the method comprises a step of: rinsing the mould drum after the cleaning step and before the treating step.

5. The method according to claim 1, wherein the bacteriostatic-substance is an organic acid in a concentration between 0.5-2 weight %.

6. The method according to claim 1, wherein the bacteriostatic-substance is provided on a surface of the mould drum and/or within the at least partially porous structure and/or in the passage of the mould drum.

7. The method according to claim 1, wherein during the storing step, the mould drum is maintained moist.

8. The method according to claim 1, wherein the mould drum is covered with a bacteriostatic film before the storing step.

9. A method for cleaning a mould drum for moulding products from a mass of food starting material, the mould drum comprising one or more cavities, each of the one or more cavities having a mould cavity wall having an at least partially porous structure, and each of the one or more cavities is connected to a passage, the method comprises step of: cleaning the mould drum and providing a cleaning fluid via the passage,
   wherein prior and/or during the cleaning step, a pressure and/or fluid flow of the cleaning fluid is measured, and a pressure drop of the cleaning fluid is measured across the at least partially porous structure, and
   wherein the cleaning step is carried out and/or changed until a reference value of the pressure of the cleaning fluid and/or the pressure drop of the cleaning fluid is measured or determined.

10. The method according to claim 9, wherein the measurement is used to select a cleaning process.

11. The method according to claim 10, wherein the cleaning process is controlled based on the measurement.

12. The method according to claim 9, wherein the reference value is a pressure drop of the mould drum prior to its first use in production and/or after a revision.

13. A method of using a mould drum for moulding food products from a mass of food starting material, the mould drum comprising one or more cavities, each of the one or more cavities having a mould cavity wall having an at least partially porous structure, and wherein each of the mould cavities is connected to a passage, the method comprising steps of:
   a. removing the mould drum from a storage,
   b. removing a bacteriostatic from the mould drum,
   c. moulding products from a food starting, material, and rotating the mould drum during the moulding step;
   e. wetting a surface of the mould drum, and
   f. restarting the moulding step wherein during the interrupting step, the mould drum maintains its rotation.

14. The method according to claim 13, the passages is connected to a fluid source.

15. The method according to claim 13, wherein the method comprises a rinsing step that takes place in an apparatus to form the food products from the mass of food starting material.

16. The method according to claim 13, wherein the mould drum rotates during a rinsing step.

17. The method according to claim 13, wherein the method comprises a step of: removing a rinsing fluid from a channel and/or from the at least partially porous structure by compressed gas.

18. A method of using a mould drum for moulding products from a mass of food starting material, the mould drum comprising one or more cavities, each of the one or more cavities comprising a mould cavity wall having an at least partially porous structure, the method comprising steps of:
- a. moulding the products from the food starting material, the mould drum is rotated during the moulding step;
- b. interrupting the moulding step,
- c. wetting a surface of the mould drum, and
- d. restarting of the moulding step, wherein during the interrupting step, the mould drum maintains its rotation.

19. The method according to claim 18, wherein the method comprises a step of: spraying water on the surface of the mould drum upstream from a mass feed member.

20. The method according to claim 19, wherein the method comprises a step of: removing the water from the mould drum in a discharge position.

* * * * *

UNITED STATES PATENT AND TRADEMARK OFFICE
CERTIFICATE OF CORRECTION

PATENT NO. : 10,609,933 B2
APPLICATION NO. : 15/555655
DATED : April 7, 2020
INVENTOR(S) : Marinus Johannes Wilhelmus et al.

Page 1 of 1

It is certified that error appears in the above-identified patent and that said Letters Patent is hereby corrected as shown below:

In the Claims

Column 12, After Line 49 insert the following line --d. interrupting the moulding step,--

Signed and Sealed this
Thirtieth Day of June, 2020

Andrei Iancu
*Director of the United States Patent and Trademark Office*